US007284371B2

(12) United States Patent
Toji et al.

(10) Patent No.: US 7,284,371 B2
(45) Date of Patent: Oct. 23, 2007

(54) HYDRAULIC CONTROL SYSTEM FOR WORKING MACHINE

(75) Inventors: Yutaka Toji, Hiroshima (JP); Yoichiro Yamazaki, Hiroshima (JP); Hidekazu Oka, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 114 days.

(21) Appl. No.: 11/078,340

(22) Filed: Mar. 14, 2005

(65) Prior Publication Data

US 2005/0204912 A1 Sep. 22, 2005

(30) Foreign Application Priority Data

Mar. 18, 2004 (JP) ............................ 2004-078856

(51) Int. Cl.
*F16D 31/02* (2006.01)

(52) U.S. Cl. ........................................................ 60/445

(58) Field of Classification Search .................. 60/445, 60/450

See application file for complete search history.

(56) References Cited

U.S. PATENT DOCUMENTS 4,823,552 A * 4/1989 Ezell et al. .................... 60/445

FOREIGN PATENT DOCUMENTS

| | | |
|---|---|---|
| JP | 58-193906 | 11/1983 |
| JP | 7-133808 | 5/1995 |
| JP | 10-54370 | 2/1998 |
| JP | 11-303809 | 11/1999 |
| JP | 2000-282515 | 10/2000 |

* cited by examiner

*Primary Examiner*—F. Daniel Lopez
(74) *Attorney, Agent, or Firm*—Oblon, Spivak, McClelland, Maier & Neustadt, P.C.

(57) ABSTRACT

A hydraulic control system for a working machine according to the present invention includes a regulator control valve for controlling an operation of a pump regulator and a controller for sending a control signal for changing a discharge quantity of the pump to the regulator control valve in accordance with an operation amount of an operating device. This system further includes a fail-safe valve disposed in a control line joining the pump regulator and the regulator control valve. The fail-safe valve is configured so as to switch from an ordinary position to a fail-safe position in accordance with a failure signal indicative of failure in the regulator control valve.

1 Claim, 5 Drawing Sheets

HYDRAULIC CONTROL SYSTEM FOR WORKING MACHINE

BACKGROUND OF THE INVENTION

1. Field of the Invention

The present invention relates to a hydraulic control system for a working machine such as a hydraulic excavator.

2. Description of the Related Art

As hydraulic pump control systems for working machines such as hydraulic excavators, there are known a positive control system and a negative control system. In both control systems, a pump controller is composed of a pump regulator for controlling a discharge amount of a hydraulic pump, a regulator control valve of electromagnetic proportional type for controlling an operation of the pump regulator, and a controller for controlling the regulator control valve.

In such electronic control systems, however, once there occurs failure of the electromagnetic proportional valve itself or of the control system such as breaking of wire in a signal system which is for sending a control signal from the controller to the regulator control valve, a pump controlling oil pressure provided from the regulator control valve vanishes (or lowers), with the result that the pump discharge amount becomes minimum and a normal actuator operation cannot be performed.

Consequently, in the working machine concerned, it becomes impossible to actually carry out a work at a working site. For this reason, it has actually been difficult to adopt the electronic control systems for the hydraulic pump.

SUMMARY OF THE INVENTION

It is an object of the present invention to provide a hydraulic control system for a working machine which, despite of adopting an electronic control system for a hydraulic pump, can continue a work even during failure of a control system.

The hydraulic control system for a working machine according to the present invention comprises, as a basic configuration thereof, hydraulic actuators, a variable capacity hydraulic pump as an oil pressure source for the hydraulic actuators, a pump regulator for controlling a discharge amount of the hydraulic pump, an electromagnetic proportional regulator control valve for controlling an operation of the pump regulator, and a controller for sending a control signal for changing the discharge amount of the hydraulic pump to the regulator control valve in accordance with an operation amount of an operating means, wherein in accordance with the control signal a secondary pressure in the regulator control valve is provided as a controlling oil pressure to the pump regulator. Further, a fail-safe valve is disposed in a pump control line joining the pump regulator and the regulator control valve. The fail-safe valve has an ordinary position for sending the secondary pressure in the regulator control valve as a controlling oil pressure to the pump regulator and a fail-safe position for sending oil pressure from a path other than the regulator control valve as a pump controlling oil pressure (hereinafter referred to, as the case may be, simply as "controlling oil pressure") to the pump regulator in such a manner that a predetermined pump discharge amount is ensured. The fail-safe valve is configured so as to switch from the ordinary position to the fail-safe position in accordance with a failure signal indicative of failure in operation of the regulator control valve.

In this case, upon occurrence of failure of the regulator control valve, the fail-safe valve switches from the ordinary position to the fail-safe position automatically, whereby the pump controlling oil pressure is fed to the pump regulator from the above path. Thus, it is possible to continue an operation of the pump regulator while ensuring a predetermined pump discharge amount (e.g., maximum discharge amount).

DESCRIPTION OF THE PREFERRED EMBODIMENTS

Figure 1:
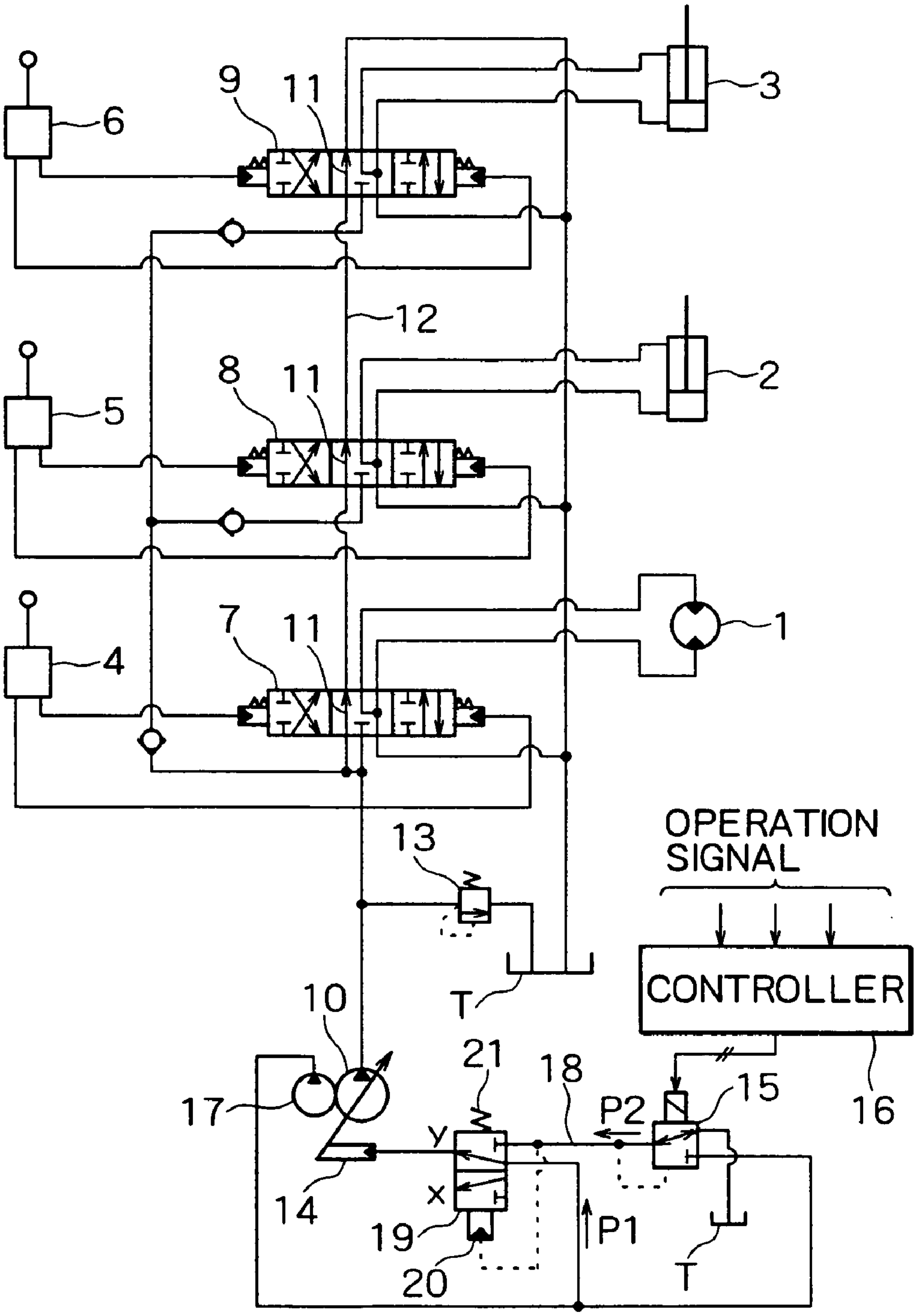
FIG. 1 is a circuit as a hydraulic control system configuration diagram according to a first embodiment of the present invention.

Embodiments of the present invention will be described in detail herein under with reference to FIGS. 1 to 5.

As control systems for controlling a discharge amount of a hydraulic pump for a working machine such as a hydraulic excavator, both positive and negative control systems will be described later, but the positive control system premises a configuration wherein a hydraulic pilot type control valve for controlling an operation of an actuator is operated by a remote control valve. According to the positive control system, a pilot pressure (positive control pressure) fed from the remote control valve to the control valve is detected and the pump discharge amount is controlled in accordance with the detected positive control pressure.

On the other hand, the negative control system premises a configuration wherein a bleed-off passage is provided in each control valve and is connected to a tank through a center bypass line. According to the negative control system, a throttle is provided on the most downstream side of the center bypass line, then an oil pressure (throttle inlet pressure=negative control pressure) developed by the throttle is detected and the pump discharge amount is controlled in accordance with the detected negative control pressure.

In each of the following embodiments (FIGS. 1 to 5), there is adopted, as an example, a circuit configuration as this hydraulic control system wherein three hydraulic actuators 1, 2, 3 are provided, control valves 7, 8 and 9 are operated respectively by remote control valves 4, 5 and 6 as operating means, and pressure oil discharged from a main hydraulic pump 10 is fed to the hydraulic actuators 1 to 3 through the control valves 7 to 9. The discharge amount of pressure oil from the hydraulic pump 10 is controlled in accordance with the operation amount of the remote control valves 4, 5 and 6.

In this circuit, bleed-off passages 11 for bleed-off control are provided in the control valves 7 to 9 respectively. The bleed-off passages 11 are tandem connected by a center bypass line 12 and are in communication with a tank T. Numeral 13 denotes a relief valve.

As means for controlling the discharge amount of the main hydraulic pump 10, there are provided a pump regulator 14 for changing tilt-sliding of the pump, an electromagnetic proportional regulator control valve 15 of electromagnetic proportional type (an electromagnetic proportional regulator control valve 15) for sending a pump controlling oil pressure to the pump regulator 14, a controller (controller) 16 for outputting a control signal to the regulator control valve 15 in accordance with an operation of the remote control valves 4 to 6, and an auxiliary hydraulic pump 17 for supplying a primary pressure to the regulator control valve 15.

First Embodiment (see FIG. 1)

The operation amount of the remote control valves 4 to 6 is detected by pressure sensors (not shown). A secondary pressure (pump controlling oil pressure) in the regulator control valve 15 changes in accordance with a control signal provided from the controller 16, the control signal being based on operation signals generated by operation of the remote control valves 4 to 6.

Thus, there is performed a pump control in accordance with the positive control system wherein the larger the operation amount of the remote control valves 4 to 6 is, the larger the discharge amount from the main hydraulic pump 10 would be.

A fail-safe valve 19 is disposed in a pump control line 18 joining the pump regulator 14 and the regulator control valve 15.

The fail-safe valve 19 is configured as a hydraulic pilot type switching valve adapted to make switching between an ordinary position x and a fail-safe position y on the basis of a pilot pressure introduced into a hydraulic pilot port 20 and a spring force of a return spring 21 as a resilient member resisting to the pilot pressure. At the ordinary position x of the fail-safe valve 19 a secondary pressure P2 in the regulator control valve 15 is fed as a pump controlling oil pressure to the pump regulator 14, and at the fail-safe position y an oil pressure (a primary pressure in the regulator control valve 15) P1 provided from the auxiliary hydraulic pump 17 is fed as a pump controlling oil pressure to the pump regulator 14.

The pressures P1 and P2 are in a relation of P1>P2 and are set so that the pump discharge amount becomes maximum at P1. The secondary pressure P2 in the regulator control valve 15 is introduced as a pilot pressure into the hydraulic pilot port 20 of the fail-safe valve 19. When the secondary pressure P2 drops below or not larger than a preset value (when the regulator control valve 15 assumes a state of failure), the spring force of the return spring 21 surpasses the secondary pressure, so that the fail-safe valve 19 switches from the ordinary position x to the fail-safe position y.

That is, in accordance with a failure signal issued when the secondary pressure P2 drops below the preset value, the fail-safe valve 19 switches from the ordinary position x to the fail-safe position y under the spring force of the return spring 21.

According to this configuration, in the normal condition, when the remote control valves 4 to 6 are operated, operation signals are produced and a signal is outputted from the controller 16 to the regulator control valve 15 on the basis of the operation signals, then a secondary pressure proportional to the operation amount is outputted from the control valve 15.

At this time, since the secondary pressure P2 in the regulator control valve 15 is above the preset value, the pilot pressure in the fail-safe valve 19 overcomes the spring force of the return spring 21 and the fail-safe valve 19 is set to the ordinary position x.

Therefore, the secondary pressure P2 in the regulator control valve 15 is fed to the pump regulator 14 through the fail-safe valve 19 and the ordinary pump control is performed in accordance with the positive control system.

On the other hand, for example when there occurs a failure such as breaking of wire in the control system joining the controller 16 and the regulator control valve 15 and the regulator control valve 15 becomes uncontrollable, the secondary pressure P2 drops below the preset value. Consequently, the fail-safe valve 19 switches to the fail-safe position y under the spring force of the return spring 21.

Accordingly, hydraulic pressure from the auxiliary hydraulic pump 17 is fed directly to the pump regulator 14 via the fail-safe valve 19 without passing through the regulator control valve 15 (without pressure reduction). Thus, the discharge amount of the main hydraulic pump 10 is set and fixed to maximum.

In this way, even upon failure of the regulator control valve 15, a required pump discharge amount is ensured and the work can be continued.

According to this first embodiment, moreover, since there is adopted a configuration wherein, upon the occurrence of a failure (when the pump controlling oil pressure from the regulator control valve 15 drops below the preset value), the fail-safe valve 19 switches to the fail-safe position y under the spring force of the return spring 21, that is, the fail-safe valve 19 is switched by both the hydraulic pressure and the spring force, there is no fear of failure of the control system for the fail-safe valve 19 and the reliability of operation becomes high.

Figure 2:
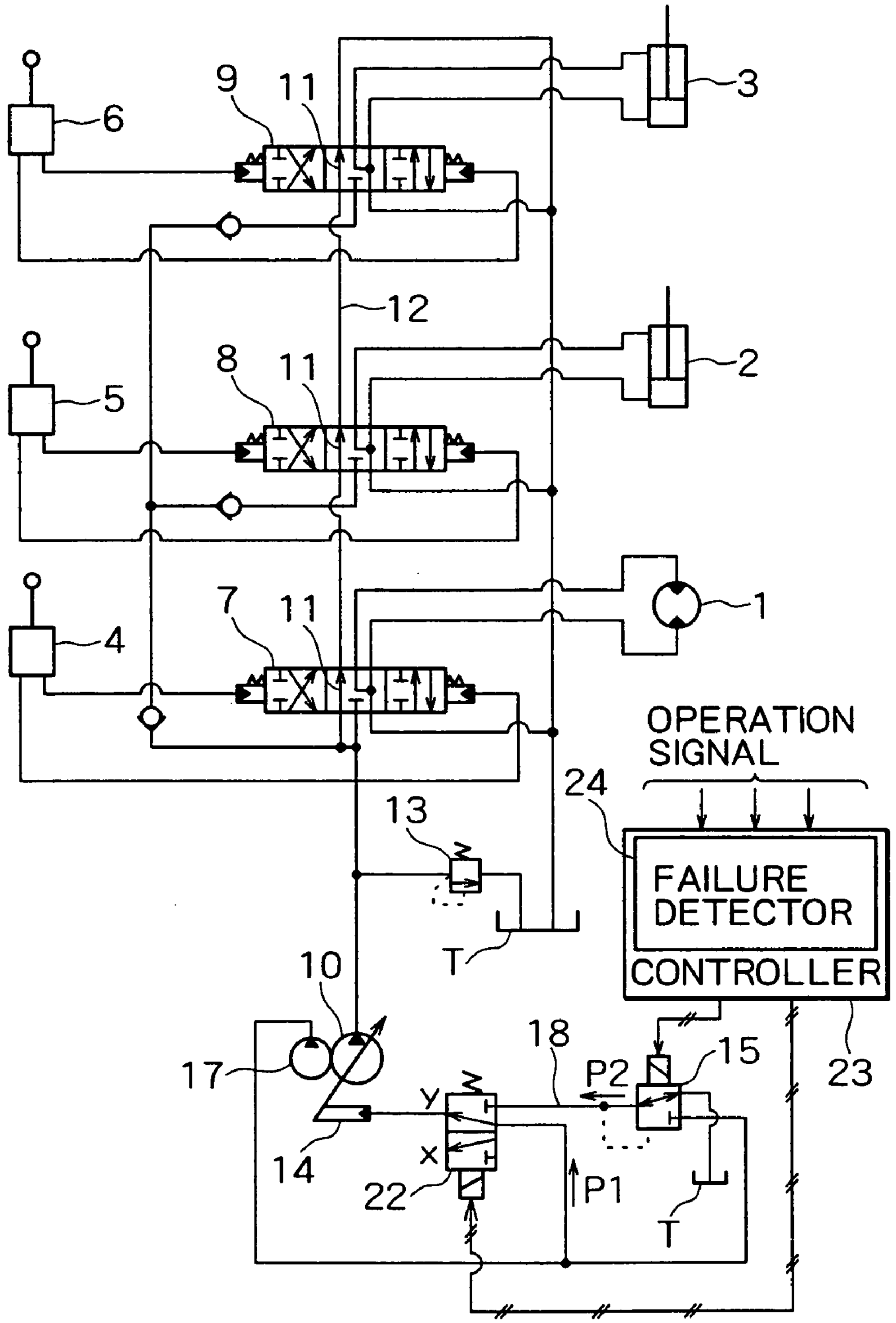
FIG. 2 is a circuit configuration diagram according to a second embodiment of the present invention.

Second Embodiment (see FIG. 2)

In this second embodiment, reference will be made to only different points from the first embodiment.

In this second embodiment, a fail-safe valve (electromagnetic switching valve) 22 of an electromagnetic switching type adapted to switch between the ordinary position x and the fail-safe position y in accordance with an electric signal is disposed in the pump control line 18 instead of the hydraulic pilot switching type fail-safe valve 19 described in the first embodiment. The switching of the fail-safe valve 22 is controlled by means of a controller 23.

In the controller 23 is provided a failure detector 24 for detecting the occurrence of failure (output failure) such as wire breaking in an output signal system for the regulator control valve 15 on the basis of for example a decrease of voltage or current. When the occurrence of failure is detected by the failure detector 24, a switching signal for switching to the fail-safe position y is outputted from the controller 23 to the fail-safe valve 22.

Thus in this second embodiment, in the event of failure of the regulator control valve 15, the fail-safe valve 22 also switches from the ordinary position x to the fail-safe position y, whereby the oil pressure P1 from the auxiliary hydraulic pump 17 is fed as a pump controlling oil pressure to the pump regulator 14 and the discharge amount of the main hydraulic pump 10 is set and fixed to a maximum.

According to the configuration of this embodiment described above, the oil pressure from the auxiliary hydraulic pump 17 is not only fed as a primary pressure to the regulator control valve 15 but also fed as a pump controlling oil pressure to the pump regulator 14 in the switched state of the fail-safe valve 22 (19 in the first embodiment) to the fail-safe position y.

In this case, since the pump controlling oil pressure is fed from the common auxiliary hydraulic pump 17 in both normal condition and failed condition, the configuration is simple and equipment cost is low in comparison with the case where a separate pressure source is added for use in the failed condition.

Figure 3:
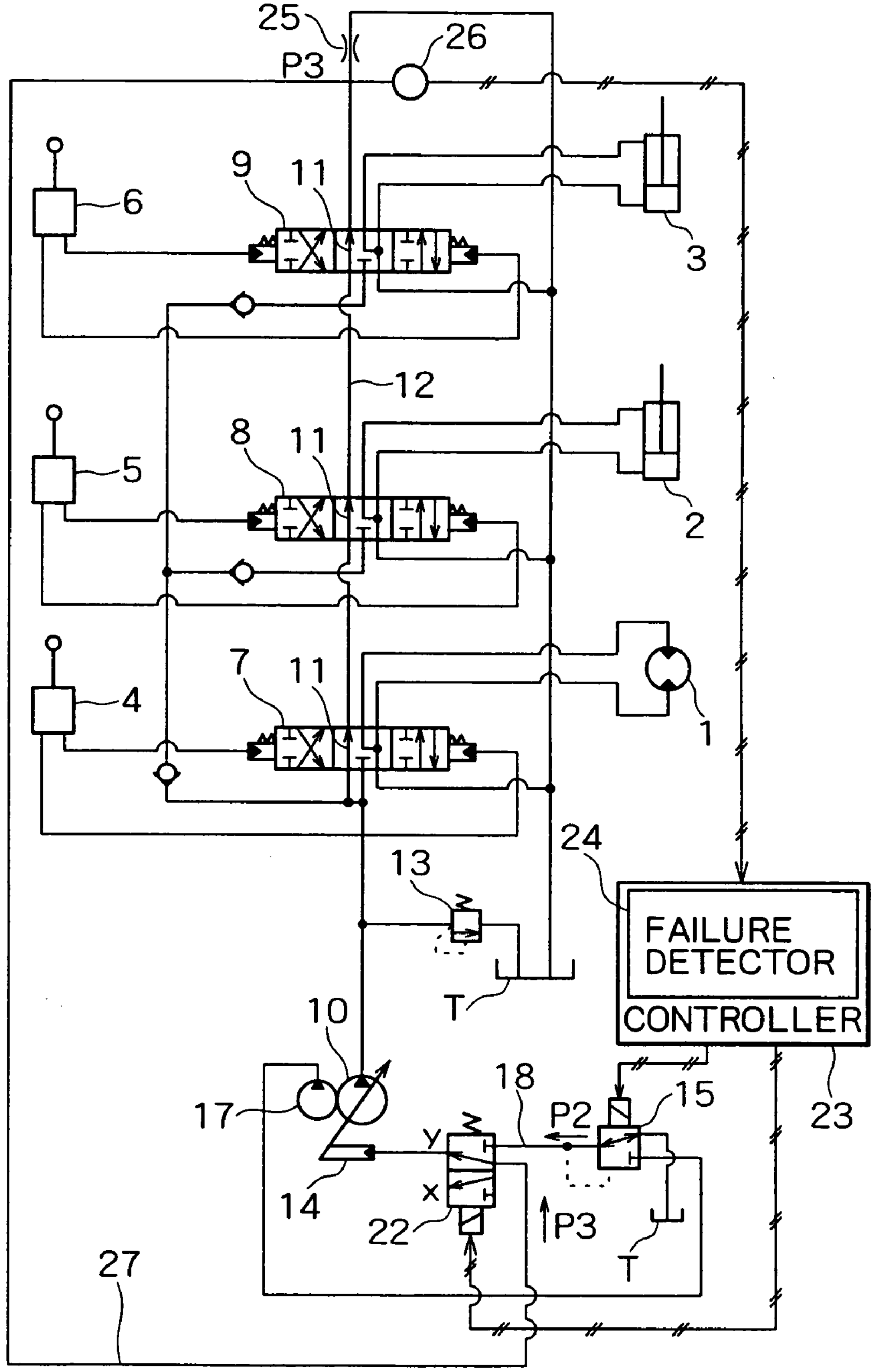
FIG. 3 is a circuit configuration diagram according to a third embodiment of the present invention.

Third Embodiment (see FIG. 3)

According to the configurations of the above first and second embodiments which premise pump control based on the positive control system, the oil pressure P1 is fed from the auxiliary hydraulic pump 17 to the pump regulator 14 upon failure of the regulator control valve 15. On the other hand, in this third embodiment illustrated in FIG. 3, which premises control of the pump discharge amount in accordance with the negative control system, a negative control pressure P3 is fed as a pump controlling oil pressure to the pump regulator 14 upon failure of the regulator control valve 15.

More specifically, a throttle 25 is provided on the most downstream side of the center bypass line 12 and the pressure (negative control pressure) P3 which is developed on the inlet side of the throttle 25 in accordance with a bleed-off flow rate is detected by a pressure sensor 26 and is inputted to the controller 23.

The controller 23 judges that the higher the negative control pressure P3 is, the smaller the flow rate required of the actuators would be, and then outputs a control signal in the direction to decrease the pump discharge amount to the regulator control valve 15.

The point that the auxiliary hydraulic pump 17 is used as a primary pressure source for the regulator control valve 15, the point that in the normal condition the secondary pressure P2 in the control valve 15 is fed to the pump regulator 14, and the point that the occurrence of failure of the regulator control valve 15 is detected by the failure detector 24 in the controller 23, are the same as in the second embodiment.

The point that the electromagnetic switching type fail-safe valve 22 is disposed in the pump control line 18 is also the same as in the second embodiment. On the other hand, this third embodiment is different from the second embodiment in that, upon switching of the fail-safe valve 22 to the fail-safe position y, not the oil pressure P1 in the auxiliary hydraulic pump 17, but the negative control pressure P3 developed by the throttle 25 is fed to the pump regulator through a negative control pressure output line 27 and the fail-safe valve 22.

According to this configuration, in the failed condition of the regulator control valve 15, there is also performed the same pump control based on the negative control system as in the normal condition. Thus, the same actuator control as in the normal condition can be also done in the failed condition of the regulator control valve.

Figure 4:
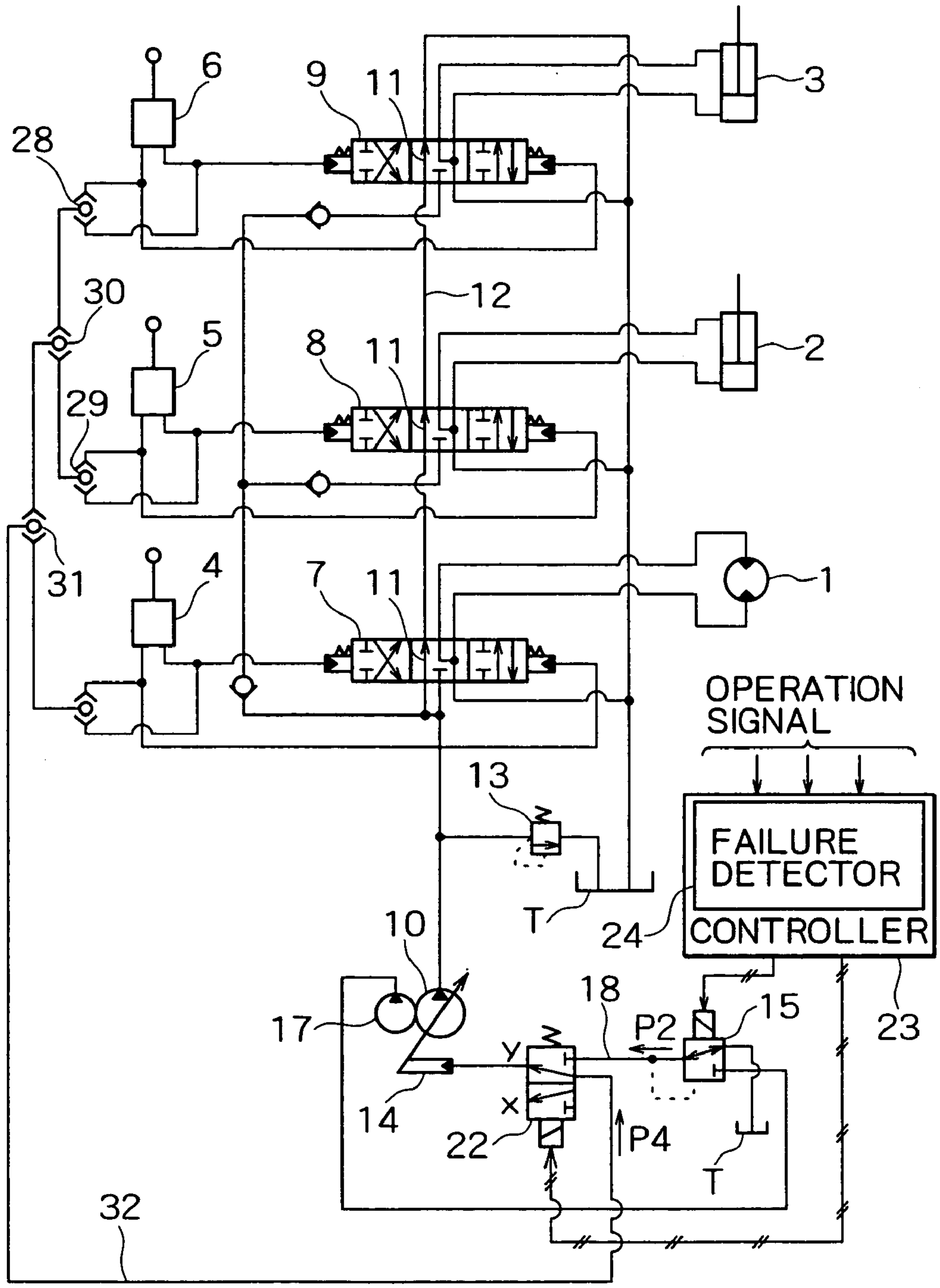
FIG. 4 is a circuit configuration diagram according to a fourth embodiment of the present invention.

Fourth Embodiment (see FIG. 4)

As in the first and second embodiments, this fourth embodiment illustrated in FIG. 4 premises the positive control system wherein the operation amounts of the remote control valves 4 to 6 are detected by sensors and fed to the controller 23, then the pump discharge amount is controlled in accordance with the detected operation amounts.

According to this positive control system, when the regulator control valve 15 is in the failed condition, pilot pressures corresponding to the operation amount of the remote control valves is selected by a high-order selection in multi-stage shuttle valves 28, 29, 30 and 31 and the selected pilot pressure (positive control pressure) P4 is fed as a pump controlling oil pressure to the pump regulator 14 through a positive control pressure output line 32 and the fail-safe valve 22.

According to this configuration, as in the third embodiment, the same pump control based on the positive control system as in the normal condition can be also ensured in the failed condition and it is possible to continue the same actuator operation as in the normal condition.

The configurations of the above third and fourth embodiments can be summarized as follows.

According to the configuration of the third embodiment of the present invention, the bleed-off passages 11 are disposed in the control valves 7 to 9 for controlling the operations of the hydraulic actuators each independently, the bleed-off passages 11 in the control valves 7 to 9 being tandem connected to the tank T by means of the center bypass line 12, the throttle 25 is provided on the most downstream side of the center bypass line 12, the controller 23 as controller sends a control signal which causes the discharge amount of the hydraulic pump 10 to be changed to the regulator control valve 15 in accordance with a negative control pressure developed by the throttle 25, and in the switched state of the fail-safe valve 22 to the fail-safe position y the aforesaid negative control pressure is fed as a pump controlling oil pressure to the pump regulator 14.

According to the configuration of the fourth embodiment of the present invention, the controller 23 as controller sends a control signal which causes the discharge amount of the hydraulic pump 10 to be changed to the regulator control valve 15 in accordance with a positive control pressure developed by the operation of the remote control valves 4 to 6 as operating means, and in the switched state of the fail-safe valve 22 to the fail-safe position y, the aforesaid positive control pressure is fed as a pump controlling oil pressure to the pump regulator 14.

According to the third and fourth embodiments, in case of controlling the pump discharge amount based on the negative or positive control system, a negative or positive control pressure is utilized as a pump controlling oil pressure, so that the control of the pump discharge amount based on the negative or positive control system can be also maintained in the failed condition. That is, the same pump control and actuator control as in the normal condition can be also maintained in the failed condition.

Figure 5:
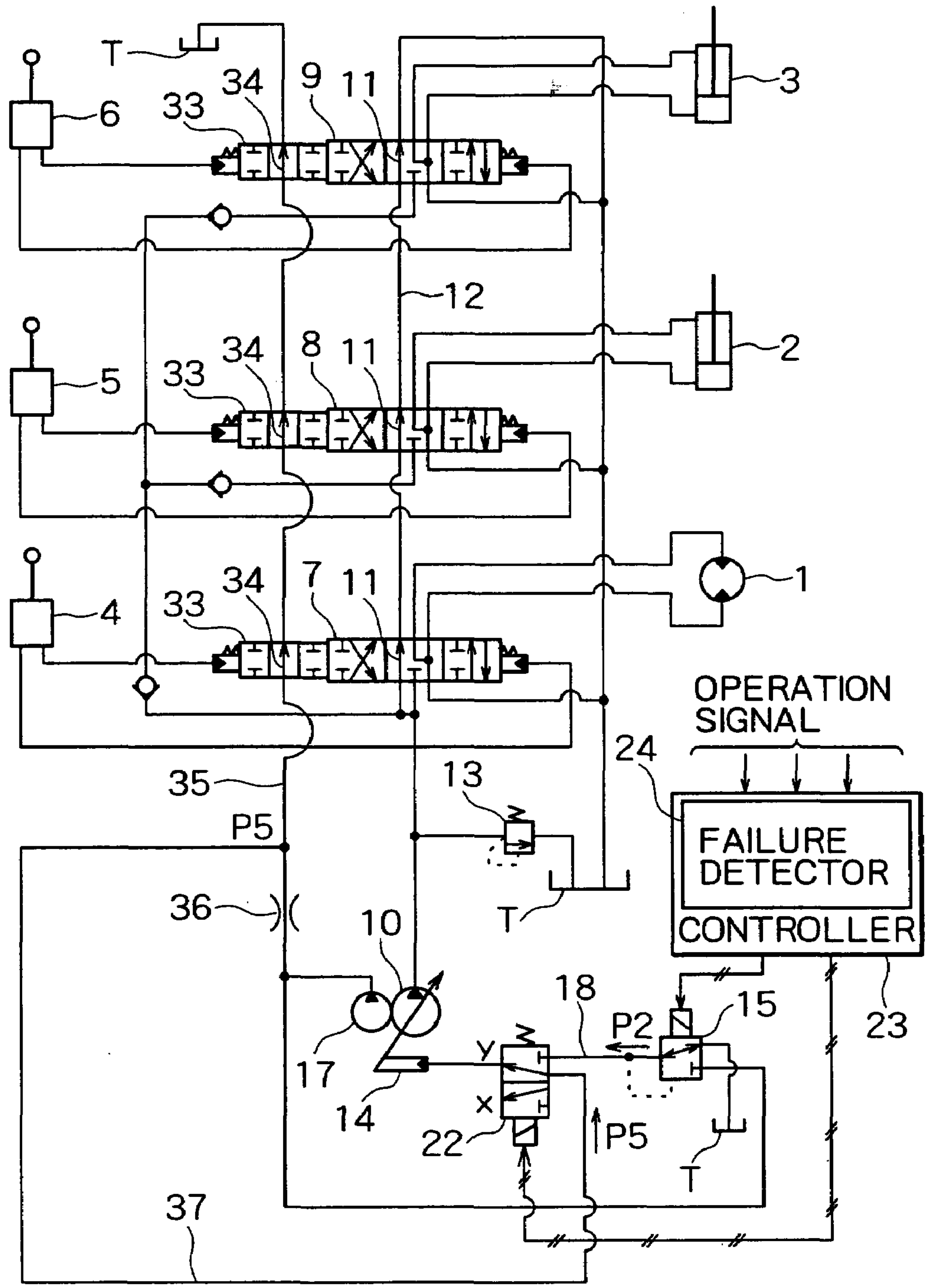
FIG. 5 is a circuit configuration diagram according to a fifth embodiment of the present invention.

Fifth Embodiment (see FIG. 5)

As an actuator control valve, there is known a switching valve wherein a side spool adapted for a stroke operation integrally with a main spool is provided on one side of the main spool.

In this fifth embodiment, there are used switching valves provided with such side spools 33 respectively for the control valves 7 to 9.

Side by-path 34 adapted to open when the remote control valves 4 to 6 are in the neutral position and close when those valves operate are formed respectively in the respective side spools 33. The side by-path 34 are tandem connected to the auxiliary hydraulic pump 17 and the tank T by means of a side by-path line 35.

A throttle 36 for developing pump pressure is provided on the discharge side of the auxiliary hydraulic pump 17 in the side by-path line 35. A pump controlling oil pressure line 37 connected to the outlet side of the throttle 36 is connected to the fail-safe valve 22.

In this configuration, when none of the control valves 7 to 9 are operated, the side by-path 34 in the side spools 33 open and communicate with the tank T through the side by-path line 35. Therefore, no pressure is developed on the outlet side of the throttle 36.

On the other hand, when at least one of the control valves 7 to 9 is operated, a pressure P5 is developed on the outlet side of the throttle 36 by closing of the associated side by-path 34.

Therefore, if a valve operation is performed in the switched state of the fail-safe valve 22 to the fail-safe position y after the occurrence of failure in the regulator control valve 15, the pressure P5 is applied as a pump controlling oil pressure to the pump regulator 14 through the fail-safe valve 22.

Thus, as in the other embodiments, the operation (required pump discharge amount) can be also ensured in the failed condition.

According to the configuration of this fifth embodiment, as described above, the side spools 33 provided with side by-path 34 adapted to close upon the operation of the control valves 7 to 9 are provided in the control valves 7 to 9 which control the operations of hydraulic actuators each independently, the side by-path line 35 which connects the side by-path 34 in the control valves 7 to 9 tandem to the oil pressure source and the tank T is provided, and in the switched state of the fail-safe valve 22 to the fail-safe position y the oil pressure developed in the side by-path line 35 upon the operation of the control valves 7 to 9 is fed as a pump controlling oil pressure to the pump regulator 14.

Although the invention has been described with reference to the preferred embodiments in the attached figures, it is noted that equivalents may be employed and substitutions made herein without departing from the scope of the invention as recited in the claims.

We claim:

1. A hydraulic control system for a working machine, comprising:

hydraulic actuators;

a variable capacity hydraulic pump as an oil pressure source for said hydraulic actuators;

a pump regulator for controlling a discharge amount of said hydraulic pump;

an electromagnetic proportional regulator control valve for controlling an operation of said pump regulator;

a controller adapted to send a control signal for changing the discharge amount of said hydraulic pump to said regulator control valve in accordance with an operation amount of an operating means, wherein a secondary pressure in said regulator control valve being fed as a controlling oil pressure to said pump regulator in accordance with said control signal; and a fail-safe valve disposed in a pump control line joining said pump regulator and said regulator control valve, said fail-safe valve having an ordinary position for sending the secondary pressure in said regulator control valve as a controlling oil pressure to said pump regulator and a fail-safe position for sending an oil pressure from a path other than said regulator control valve as a pump controlling oil pressure to said pump regulator in such a manner that a predetermined pump discharge amount is ensured, said fail-safe valve being configured so as to switch from said ordinary position to said fail-safe position in accordance with a failure signal indicative of failure in operation of said regulator control valve;

wherein said fail-safe valve is configured as a hydraulic pilot switching valve with a hydraulic pilot port adapted to switch between said ordinary position and said fail-safe position on the basis of a pilot pressure introduced into said hydraulic pilot port and a spring force resisting said pilot pressure, the secondary pressure in said regulator control valve is introduced into the hydraulic pilot port of said fail-safe valve, a signal is issued as the failure signal when said secondary pressure drops below a preset value, and, in accordance with said signal, the fail-safe valve switches from said ordinary position to said fail-safe position by said spring force.

* * * * *